（12） United States Patent
Das et al.

(10) Patent No.: US 7,564,827 B2
(45) Date of Patent: Jul. 21, 2009

(54) ADAPTIVE HYBRID RETRANSMISSION METHOD FOR WIRELESS COMMUNICATIONS

(75) Inventors: Arnab Das, Old Bridge, NJ (US); Farooq Ullah Khan, Manalapan, NJ (US); Ashwin Sampath, Somerset, NJ (US); Hsuan-Jung Su, Ocean, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1660 days.

(21) Appl. No.: 10/036,927

(22) Filed: Oct. 19, 2001

(65) Prior Publication Data

US 2003/0076783 A1    Apr. 24, 2003

(51) Int. Cl.
*H04L 12/26* (2006.01)
(52) U.S. Cl. .................. 370/342; 370/465
(58) Field of Classification Search ......... 370/442, 370/345, 278, 342, 465; 375/295, 298, 347
See application file for complete search history.

(56) References Cited

U.S. PATENT DOCUMENTS

| 5,781,542 | A  | * | 7/1998  | Tanaka et al. | ......... | 370/342 |
| 6,366,568 | B1 | * | 4/2002  | Bolgiano et al. | ....... | 370/320 |
| 6,650,630 | B1 | * | 11/2003 | Haartsen | .............. | 370/345 |
| 2002/0013135 | A1 | * | 1/2002 | Proctor, Jr. | .......... | 455/228 |
| 2002/0141367 | A1 | * | 10/2002 | Hwang et al. | ......... | 370/335 |
| 2003/0081692 | A1 | * | 5/2003 | Kwan et al. | .......... | 375/295 |

FOREIGN PATENT DOCUMENTS

WO    WO 01/37506 A    5/2001

OTHER PUBLICATIONS

Lucent Technologies: "TSGR1#18(01)0083. Context Sensitive Modulation And Coding Sets", *TSG-RAN Working Group 1*. 3GPP. 'Online! retrieved from the Internet: <URL:www.3gpp.org>.
Parkvall et al, "The High Speed Packet Data Evolution of WCDMA", *12th IEEE International Symposium on Personal, Indoor and Mobile Radio Communications, PIMRC 2001*, vol. 2, Sep. 30, 2001, pp. 27-31.
Das et al, "A2aR: An Asynchronous And Adaptive Hybrid ARQ Scheme For 3G Evolution", *VTC 2001 Spring IEEE VTS Vehicular Technology Conference*, Rhodes, Greece, May 6-9, 2001, *IEEE Vehicuiar Technology Conference*, New York, NY vol. 1 of 4, Conf. 53, pp. 628-632.

* cited by examiner

*Primary Examiner*—Melvin Marcelo

(57) ABSTRACT

An adaptive incremental redundancy (i.e., Hybrid ARQ) method is described for retransmitting information in a communication channel of a wireless communication system. More specifically, code multiplexing is used within fixed length frames in order to change the number of codes, modulation, and coding on retransmissions to provide the desired redundancy for successful decoding. The operation of adaptive Hybrid ARQ in the code domain also provides finer granularity in which to efficiently transmitting redundancy. In one illustrative embodiment, a method for retransmitting information in a communication channel having a plurality of fixed length frames each divided into a plurality of time slots of equal duration includes the step of code multiplexing a retransmission of a previous transmission within one of the fixed length frames using one or more of a plurality of codes. The number of codes used for the retransmission is variable based on the condition of the communication channel.

20 Claims, 2 Drawing Sheets

ADAPTIVE HYBRID RETRANSMISSION METHOD FOR WIRELESS COMMUNICATIONS

CROSS REFERENCE TO RELATED APPLICATION

Related subject matter is disclosed in commonly owned U.S. patent application Ser. No. 09/982,317, entitled "A Hybrid Transmission Method for Wireless Communications", which was filed on Oct. 18, 2001 and is incorporated by reference herein in its entirety.

TECHNICAL FIELD

The invention relates generally to wireless communication systems and, more particularly, to methods used for retransmitting information in such systems in the presence of errors and low quality communication channels.

BACKGROUND OF THE INVENTION

In wireless communication systems, an air interface is used for the exchange of information between a mobile (e.g., cell phone) and a base station or other communication system equipment. The air interface typically comprises a plurality of communication channels. As is well known, CDMA-based systems employ unique codes for multiplexing separate, simultaneous transmissions over a communication channel. In a CDMA-based system, transmission duration is fixed while the users share the resources in the code domain. In the well-known High Speed Downlink Packet Access (HSDPA) specification in the Universal Mobile Telecommunication System (UMTS) standard, for example, the available resources are shared between circuit switched voice and data users within a standard five 5 MHz channel bandwidth. HSDPA employs 2 millisecond fixed frames comprising three time slots of equal duration, e.g., 0.67 milliseconds. Due to the real-time nature of the voice traffic, the resources (e.g., power, codes, etc.) are first allocated to voice. After satisfying the needs of real-time services, the remaining resources are then shared among the data users preferably in a time-multiplexed fashion on a frame by frame basis. HSDPA users can also be code multiplexed within a frame to fully utilize the resources in the frame, e.g., if a single user cannot fully utilize the resources in a frame.

The quality of any one of the communication channels can vary depending on factors such as user location, user speed, interference from other cells, and so on. For example, a particular channel between a base station and a mobile may have an acceptable throughput at one instant in time and unacceptable throughput at another instant in time. As such, the information transmitted through a relatively low quality communication channel can be adversely affected to such an extent that the information contains errors when received. In wireless communication systems, information is channel coded to compensate for errors arising during transmission. However, channel coding alone is not always sufficient to compensate for errors. Accordingly, systems employ various link layer recovery protocols, including retransmission methods, to compensate for these errors.

One widely used retransmission method is Automatic Repeat Request (ARQ). ARQ is a method of confirming that information transmitted through a communication channel has been received without any errors. Receiving equipment sends a message to transmitting equipment acknowledging that the transmitted information was received without errors. If the transmitted information was received with errors, then the receiving equipment sends a message to request a retransmission. The transmitter can retransmit all or part of the previously transmitted information using the same or different channel coding. As is well known, incremental redundancy (IR) transmission and soft combining (also referred to as Hybrid ARQ) are used to improve the efficiency of ARQ. For example, when a lost data frame is retransmitted, the receiving equipment may combine the multiple received copies of the frame to increase the likelihood of correct decoding. Alternately, the transmitter may transmit additional parity information instead of retransmitting another copy of the lost frame.

One method for incremental redundancy operation where the transmission rates can be different for different incremental redundancy transmissions was disclosed in U.S. patent application Ser. No. 09/725,438, entitled "Rate Adaptation in a Wireless Communication System" and filed Nov. 29, 2000, the subject matter of which is incorporated herein by reference in its entirety. As described, the different transmission rates are obtained by varying the transmission time while keeping the information block size unchanged. The aforementioned reference also described a scheme in which the retransmissions only provide the additional redundancy needed to successfully decode the frame based on the quality of the previous incremental redundancy transmissions. For example, if the first transmission is performed over four (4) time slots, the retransmission can be performed over two (2) slots if the quality of the previous transmission required only two (2) slot transmission for successful decoding of the information block.

Disadvantageously, the adaptive incremental redundancy scheme in the prior art requires variable length transmissions that lead to a more complex system in terms of implementation and control signaling transmission. Moreover, the granularity that is provided by the time slot duration for transmission of redundancy in most practical systems is coarse and therefore does not promote an efficient use of the bandwidth.

SUMMARY OF THE INVENTION

The shortcomings of the prior art are overcome according to the principles of the invention in an adaptive incremental redundancy (i.e., Hybrid ARQ) method that avoids variable length transmissions (in time) by keeping fixed length frames (in time) and varying the number of codes to accurately match the desired redundancy. This involves parallel transmissions (in time) via code division multiplexing. The operation of adaptive Hybrid ARQ in the code domain also provides a much finer granularity in which to transmit the redundancy more efficiently.

In one illustrative embodiment of the invention, a method for retransmitting information in a communication channel having a plurality of fixed length frames each divided into a plurality of time slots of equal duration includes the step of code multiplexing a retransmission of a previous transmission within one of the fixed length frames using one or more of a plurality of codes. The number of codes used for the retransmission is variable based on the condition of the communication channel. As such, the adaptive Hybrid ARQ scheme according to the principles of the invention can use a different modulation, different coding, and a different number of codes for a retransmission than is used in the original transmission, but still use fixed length frames in doing so. Consequently, the complexity and other problems associated with variable length transmissions are avoided. Keeping fixed length frames also ensures easy migration to future versions of third generation (3G) wireless systems.

BRIEF DESCRIPTION OF THE DRAWINGS

A more complete understanding of the present invention may be obtained from consideration of the following detailed description of the invention in conjunction with the drawing, with like elements referenced with like reference numerals, in which.

DETAILED DESCRIPTION

Figure 1:
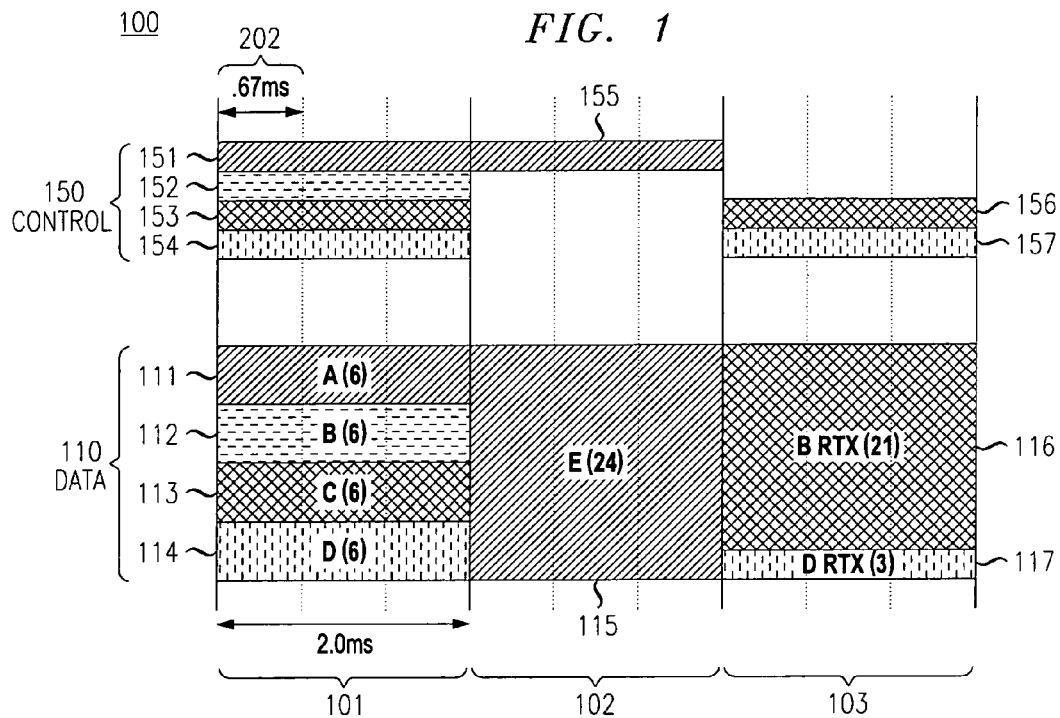
FIG. 1 shows a simplified block diagram of a communication channel format according to one exemplary embodiment of the invention.

FIG. 1 shows one exemplary embodiment of the invention in the context of wireless data transmission in the HSDPA standard. More specifically, FIG. 1 shows a simplified block diagram of a communication channel format 100 wherein data channel 110 is used for transmitting information, for example, according to well-known techniques. Control channel 150 is used for transmitting control information associated with the data transmission in data channel 110, again according to well-known techniques.

In the exemplary embodiment shown in FIG. 1, communication channel 100 is shown to include, for illustrative purposes only, three (3) data frames 101-103 each having a fixed length (duration) of 2.0 milliseconds. Each of data frames 101-103 is divided into three (3) time slots 102 each having a fixed length (duration) of 0.67 milliseconds. It should be noted that this example is meant to be illustrative only and not limiting in any way. As such, the principles of the invention can be applied to other frame formats as a matter of design choice.

According to one exemplary embodiment, code multiplexing is used for transmitting information within fixed length data frames 101-103 in an adaptive incremental redundancy (i.e., Hybrid ARQ) scheme. Related subject matter dealing with a hybrid code and time multiplexing scheme for transmitting information within fixed length time slots is described in U.S. patent application Ser. No. (Das 12-16), entitled "A Hybrid Transmission Method for Wireless Communications", the subject matter of which is incorporated herein by reference in its entirety.

As shown in FIG. 1, transmissions from users A, B, C, and D are code multiplexed within frame 101. More specifically, data transmissions 111-114 and associated control channels 151-154, respectively, are transmitted within frame 101. By way of example, twenty-four (24) codes are allocated for use. In frame 101, each of transmissions 111-114 is allocated six (6) codes. Transmission 115 from user E is shown to be allocated all twenty-four (24) codes in frame 102. Also shown in frame 102 is the associated control channel 155 for data transmission 115. With code multiplexing, multiple simultaneous transmissions can now be supported within any given frame.

As previously described, retransmissions may be requested for certain transmissions that were received with errors. In the example shown in FIG. 1, it is assumed that transmission 112 from user B and transmission 114 from user D had errors and retransmissions were requested. It should be noted that a more detailed discussion on acknowledgement and negative acknowledgements for purposes of facilitating the retransmission requests will be described in further detail below. Retransmission 116 for user B (along with its associated control channel 156) and retransmission 117 for user D (along with its associated control channel 157) are shown to occur in frame 103.

According to the principles of the invention, code multiplexing allows for adaptive incremental redundancy within the fixed length frames 101-103. In particular, the number of codes can be varied depending on how much redundancy is needed for a particular transmission. For example, there could be changes in the quality of the communications channel (e.g., poorer quality) that warrant more redundancy in the retransmission, such as the case with user B in which twenty-one (21) codes are allocated for retransmission 116 in frame 103 even though the original transmission 112 only used six (6) codes. Conversely, there could be changes in the quality of the communications channel (e.g., better quality) that warrant less redundancy in the retransmission, such as the case with user D in which three (3) codes are allocated for retransmission 117 in frame 103 instead of the six (6) codes that were used in the original transmission 114.

Accordingly, a different coding rate can be obtained for retransmissions by changing the number of codes on retransmission. For example, the coding rate for user D's retransmission 117 on three (3) codes in frame 103 will be 2R, where R is the coding rate for user D's first transmission 114 in frame 101 on six (6) codes. If user D's original transmission 114 used quadrature phase shift keying (QPSK) over six (6) codes, then retransmission over three (3) codes using 16-QAM will provide the same coding rate since 16-QAM carries two times more bits per modulation symbol.

According to the principles of the invention, the number of codes can be changed at the time of retransmission to provide the desired redundancy for successful decoding of the data transmission. For example, user B's retransmission 116 uses twenty-one (21) codes while the original transmission 112 used six (6) codes and user D used three (3) codes on retransmission 117 for an original transmission 114 over six (6) codes.

Figure 2:
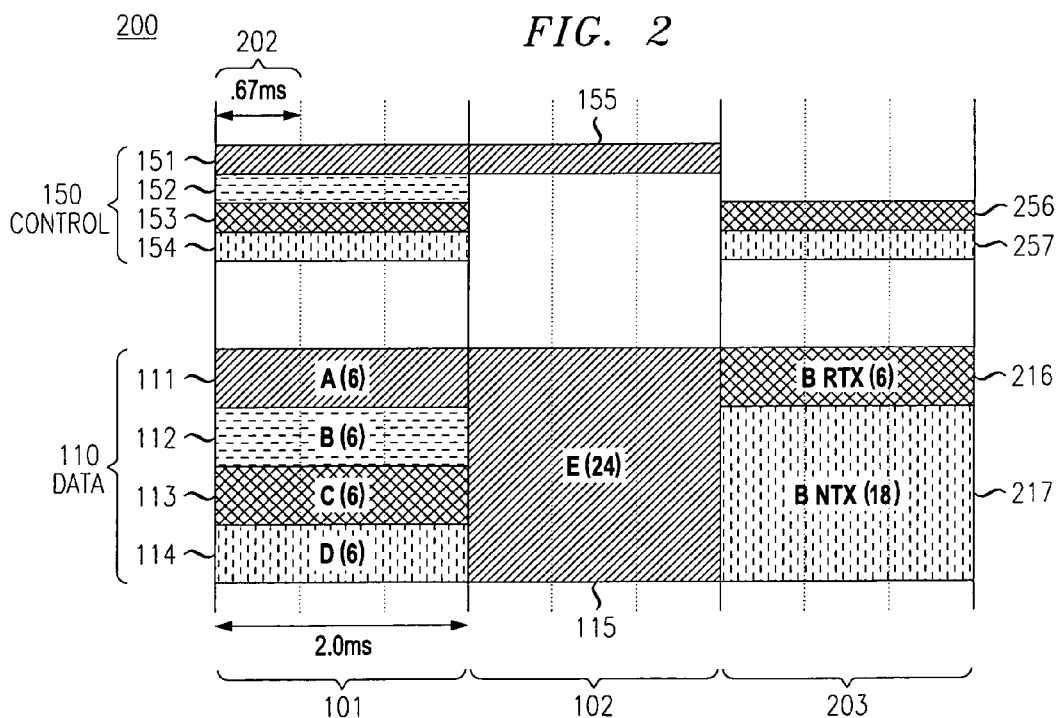
FIG. 2 shows a simplified block diagram of a communication channel format according to another exemplary embodiment of the invention.

FIG. 2 illustrates another advantage afforded by adaptive Hybrid ARQ operation in the code domain in cases where the retransmission(s) and new data transmission for the same user will need to be carried in the same frame. In particular, this can be achieved by using multiple control channels for the same user in the same frame. The control channels will carry the Hybrid ARQ (HARQ) and other control information for different HARQ transmissions in the same frame separately.

For sake of brevity, only the differences between the embodiments shown in FIG. 2 and FIG. 1 will be described herein. In particular, communication channel format 200 includes many of the same elements as previously shown and described for channel format 100 in FIG. 1, with the only differences being in frame 203. As shown in FIG. 2, a retransmission 216 for user B is performed over six (6) codes in frame 203 while a new transmission 217 to the same user is performed over eighteen (18) codes. As shown, control channels 256 and 257 correspond to retransmission 216 and new transmission 217, respectively. Because code multiplexing is used within the frames, a finer granularity is now provided so that the bandwidth can be utilized more efficiently. For example, different codes can be allocated to different combinations of transmissions that might occur in a given frame. Although only one example is shown in FIG. 2, there are others that will be readily apparent to those skilled in the art. For example, there may be multiple retransmissions for the same or different users within a frame, multiple new transmissions from different users as well as multiple retransmissions from those users, and so on. Accordingly, the example shown in FIG. 2 is only meant to be illustrative.

As previously mentioned in the case of adaptive Hybrid ARQ, multiple transmissions may need to be sent to the same user in the same frame. Multi-level acknowledgement/negative acknowledgments (ACK/NACKs) will therefore need to be sent to the transmitter separately for all the transmissions within a frame. In one exemplary embodiment, when a simultaneous transmission and retransmission is received in the same frame (e.g., as with user B in frame 203), the receiver can change the format of the typical ACK/NACK message to make it a multi-level ACK/NACK. In one exemplary embodiment, multi-level ACK/NACK can be achieved by having a different repetition factor for the ACK/NACK bits. For example, if '1' indicates an ACK and a "0" indicates a NACK in the normal signaling and is repeated n times then, in the case of an m-bit ACK/NACK, the bits will be repeated only (n/m) times. Since the transmitter is aware of the number of transmissions it performed in a given frame, it will interpret the ACK/NACK accordingly. For example, when one transmission is ACK'd and other NACK'd, the '10' can be repeated as '1010101010'. In another exemplary embodiment, multi-level ACK/NACKs can be achieved by transmitting multiple ACK/NACK bits over separate code channels. Additionally, coding can be used to provide ACK/NACK reliability. Other alternatives will also be apparent to those skilled in the art and are contemplated by the teachings herein.

Figure 3:
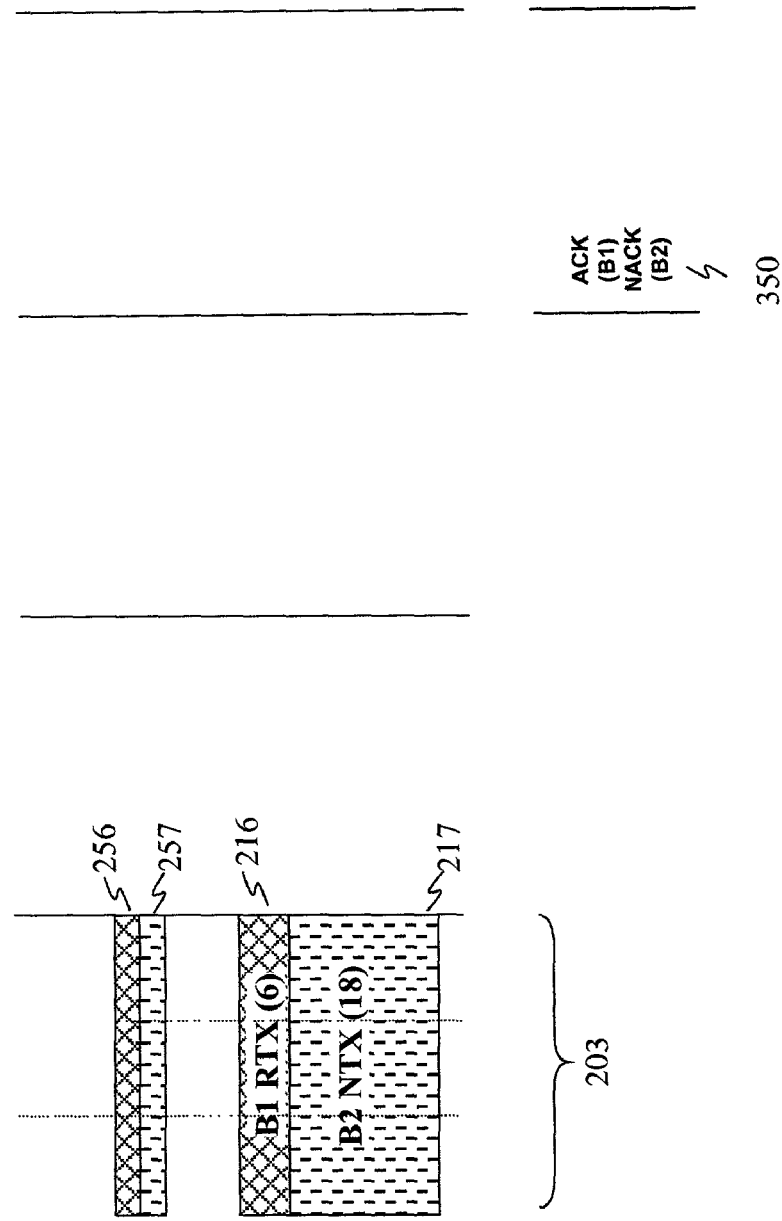
FIG. 3 shows a simplified block diagram of a communication channel format illustrative of acknowledgement and negative acknowledgements according to one exemplary embodiment of the invention.

FIG. 3 illustrates a method for sending acknowledgements (ACKs) and negative acknowledgements (NACKs) to account for the multiple transmissions that may occur within a given frame. For example, when multiple transmissions to the same user occurs in the same frame, a multi-level ACK/NACK is needed as previously mentioned. For sake of brevity, only the differences between the embodiments shown in FIG. 3 and FIG. 2 will be described herein. In particular, frame 203 from FIG. 2 is illustrated in FIG. 3.

Referring to FIG. 3, new transmission (NTX) 217 from user B and retransmissions (RTX) 216 from the same user occurs in frame 203 as previously described. According to one illustrative embodiment of the invention, multi-level ACK/NACK 350 (i.e., 2-level ACK/NACK in this particular example) is sent from the receiver to the transmitter to account for the multiple transmissions in frame 203. As shown, ACK/NACK 350 includes an acknowledgement (ACK) for user B's previous retransmission (B1) in frame 203 and a negative acknowledgement (NACK) for user B's new transmission (B2) from frame 203. This multi-level ACK (NACK is therefore advantageous for handling multiple transmissions that occur within the same frame.

In general, the foregoing embodiments are merely illustrative of the principles of the invention. Those skilled in the art will be able to devise numerous arrangements, which, although not explicitly shown or described herein, nevertheless embody those principles that are within the scope of the invention. For example, although the invention was described in the context of code multiplexing within fixed length frames, other techniques may also be suitable, e.g., frequency division multiple access (FDMA) using a variable number of frequencies, space division multiple access (SDMA) using a variable number of antennas, and so on. Accordingly, the embodiments shown and described herein are only meant to be illustrative and not limiting in any manner. The scope of the invention is limited only by the claims appended hereto.

We claim:

1. A method for retransmitting information in a communication channel of a wireless communication system, the communication channel including a plurality of fixed length frames each divided into a plurality of time slots of equal duration, the method comprising:

transmitting a code multiplexed retransmission of at least part of a previous transmission within a fixed length frame using a number of codes of a plurality of codes using a transmitter used to transmit the previous transmission when no confirmation that the information previously transmitted was correctly received, wherein the number of codes used for the retransmission is variable based on a condition of the communication channel and a desired redundancy for successful decoding of data in the retransmission.

2. The method according to claim 1, wherein redundancy contained within the retransmission is a function of the number of codes used for the previous transmission.

3. The method according to claim 1, further comprising: receiving a retransmission request for the at least part of the previous transmission, wherein the retransmission is in response to the retransmission request; and determining the condition of the communication channel based on at least one factor selected from the group consisting of quality-based parameters and available resources within the communication channel.

4. The method according to claim 1, wherein each of the fixed length frames is allocated to said plurality of codes, and further comprising: transmitting, simultaneously, a code multiplexed new transmission within said fixed length frame from said transmitter using a second number of codes of the plurality of codes, wherein the number of codes for the retransmission and the second number of the codes for the new transmission equals a total number of codes of said plurality of codes allocated to said fixed length frame.

5. The method according to claim 1, wherein the number of codes is the same for the previous transmission and the retransmission of the at least part of the previous transmission.

6. The method according to claim 1, wherein the number of codes used for the previous transmission is different than the number of codes used for the retransmission of the at least part of the previous transmission.

7. The method according to claim 1, wherein said fixed length frame is allocated to said plurality of codes, and further comprising: transmitting, simultaneously, multiple transmissions within said fixed length frame using a second number of codes of the plurality of codes, wherein the number of codes for the retransmission and the second number of the codes for the multiple transmissions equals a total number of codes of said plurality of codes allocated to said fixed length frame.

8. The method according to claim 7, wherein the multiple transmissions include a plurality of first transmissions from different users.

9. The method according to claim 7, wherein the multiple transmissions include a plurality of retransmissions of previous transmissions from different users.

10. The method according to claim 7, wherein the multiple transmissions include a plurality of retransmissions of previous transmissions from said transmitter.

11. The method according to claim 7, wherein the multiple transmissions include a first transmission and one or more retransmissions from the same user.

12. The method according to claim 7, wherein the multiple transmissions include one or more first transmissions from one or more users and one or more retransmissions of previous transmissions from the one or more users.

13. The method according to claim 1, wherein the fixed length frames have a duration of 2 milliseconds and each of the plurality of time slots has a duration of 0.67 milliseconds.

14. The method according to claim 7, further comprising the step of transmitting a multi-level acknowledgement/negative acknowledgement (ACK/NACK) in response to the multiple transmissions that occur in the same frame for the same user.

15. A method for providing adaptive incremental redundancy in a communication channel of a wireless communication system, the communication channel including a plurality of fixed length frames, the method comprising:
in a fixed length frame, sending a retransmission of at least part of a previous transmission in a domain selected from the group consisting of a code domain, a frequency domain, and a space domain using a transmitter used to transmit the previous transmission when no confirmation that the information previously transmitted was correctly received,
wherein the number of resources selected from the group consisting of codes, frequencies, and antennas that are used for the retransmission is variable and a number of codes is varied for the retransmission to provide a desired redundancy for successful decoding of data in the retransmission.

16. A method for providing adaptive incremental redundancy in a communication channel of a wireless communication system, the communication channel including a plurality of fixed length frames, the method comprising:
in a fixed length frame, sending a fixed duration retransmission of at least part of the previous transmission in a domain selected from the group consisting of a code domain, a frequency domain, and a space domain using a transmitter used to transmit the previous transmission when no confirmation that the information previously transmitted was correctly received,
wherein a transmission format associated with the domain used for the retransmission is variable and a number of codes is varied for the retransmission to provide a desired redundancy for successful decoding of data in the retransmission.

17. The method according to claim 16, wherein the transmission format in the code domain is defined by parameters including the number of codes, a modulation, and coding, wherein the transmission format in the frequency domain is defined by parameters including number of frequencies, the number of codes, the modulation, and the coding, and wherein the transmission format in the space domain is defined by parameters including number of antennas, the number of codes, the modulation, and the coding.

18. A method for providing adaptive incremental redundancy in a communication channel of a wireless communication system, the communication channel including a plurality of fixed length frames, the method comprising:
in a fixed length frame, sending a fixed duration retransmission of a previous transmission in the code domain using a transmitter used to transmit the previous transmission when no confirmation that the information previously transmitted was correctly received,
wherein a transmission format used for the retransmission is variable and a number of codes is varied for the retransmission to provide a desired redundancy for successful decoding of data in the retransmission.

19. The method according to claim 18, wherein the transmission format is defined by parameters including the number of codes, a modulation, and coding.

20. The method according to claim 19, wherein the transmission format is varied by changing one or more of the parameters.

* * * * *